United States Patent
Seagle (10) Patent No.: US 7,707,707 B2
(45) Date of Patent: May 4, 2010

(54) METHOD FOR PROVIDING A TEMPORARY DEEP SHUNT ON WAFER STRUCTURES FOR ELECTROSTATIC DISCHARGE PROTECTION DURING PROCESSING

(75) Inventor: David John Seagle, Morgan Hill, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 547 days.

(21) Appl. No.: 11/612,539

(22) Filed: Dec. 19, 2006

(65) Prior Publication Data

US 2007/0097557 A1    May 3, 2007

Related U.S. Application Data

(63) Continuation-in-part of application No. 11/029,134, filed on Jan. 4, 2005, now Pat. No. 7,469,466.

(51) Int. Cl.
G11B 5/23    (2006.01)
(52) U.S. Cl. .............. 29/603.12; 29/603.13; 29/603.15; 360/323; 360/327.1; 360/325.4; 451/41
(58) Field of Classification Search ............. 29/603.07, 29/603.12, 603.13, 603.15, 846, 847, 841; 360/320, 323, 327.21, 235.2, 235.4; 451/28, 451/41
See application file for complete search history.

(56) References Cited

U.S. PATENT DOCUMENTS

| | | | |
|---|---|---|---|
| 5,465,186 A | 11/1995 | Bajorek et al. | |
| 5,491,605 A | 2/1996 | Hughbanks et al. | |
| 5,638,237 A | 6/1997 | Phipps et al. | |
| 5,761,009 A | 6/1998 | Hughbanks et al. | |
| 5,805,390 A | 9/1998 | Takeura | |
| 5,943,187 A * | 8/1999 | Chen et al. | 360/235.2 X |
| 6,067,220 A | 5/2000 | Ahmann et al. | |
| 6,267,903 B1 | 7/2001 | Watanuki et al. | |
| 6,427,319 B1 | 8/2002 | Cook et al. | |
| 6,470,566 B2 | 10/2002 | Hsiao et al. | |
| 6,643,106 B2 | 11/2003 | Bougtaghou et al. | |

(Continued)

FOREIGN PATENT DOCUMENTS

JP    04003305 A  *  1/1992

OTHER PUBLICATIONS

Zheng et al, "Sub-100-nm Current-Perpendicular-to-Plane Sensor Fabrication", IEEE Transactions on Magnetics, vol. 40, No. 4, Jul. 2004, pp. 2248-2250.*

*Primary Examiner*—A. Dexter Tugbang (57) ABSTRACT

A method of temporarily protecting an electrically sensitive component from damage due to electrostatic discharge includes defining a shunt having first and second leads electrically connected in parallel with the component and separated by a gap. A portion of a shield layer is deposited to form the shunt between the first and second leads to span the gap therebetween and form a shunted assembly. The shunted assembly and component are lapped to form the ABS at the location of the component, a sacrificial carbon overcoat is deposited on the ABS, and additional processing is performed on the shunted assembly. A portion of the shunted assembly, the shunt, and portions of the sacrificial carbon overcoat are then removed to form an electrical open for an unshunted assembly having ABS features comprising an air bearing cavity/deep gap at a former location of the shunted assembly.

18 Claims, 10 Drawing Sheets

U.S. PATENT DOCUMENTS

| | | |
|---|---|---|
| 6,650,511 B2 | 11/2003 | Hsiao et al. |
| 2002/0085318 A1 | 7/2002 | Hsiao et al. |
| 2003/0151858 A1 | 8/2003 | Hsiao et al. |
| 2003/0214761 A1 | 11/2003 | Freitag et al. |
| 2003/0220050 A1 | 11/2003 | Bunch et al. |
| 2004/0090715 A1 | 5/2004 | Hsiao et al. |

* cited by examiner

METHOD FOR PROVIDING A TEMPORARY DEEP SHUNT ON WAFER STRUCTURES FOR ELECTROSTATIC DISCHARGE PROTECTION DURING PROCESSING

This patent application is a continuation-in-part of and claims priority to U.S. patent application Ser. No. 11,029,134, filed on Jan 4, 2005, now U.S. Pat. No. 7,469,466, which is incorporated herein by reference.

BACKGROUND OF THE INVENTION

1. Technical Field

The present invention relates in general to protecting wafer-based structures from electrostatic discharge and, in particular, to an improved system, method, and apparatus for forming and then later removing a temporary, deep shunt on a wafer structure that protects the electrically sensitive structure during fabrication.

2. Description of the Related Art

Magnetic disk drives include a rotating magnetic disk, a slider that has read and write heads, a suspension arm above the rotating disk and an actuator arm that swings the suspension arm to place the read and write heads over selected circular tracks on the rotating disk. The suspension arm urges the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic field signals from the rotating disk. The read and write heads are connected to processing circuitry that operates according to a computer program to implement the writing and reading functions.

A high performance read head employs a spin valve sensor for sensing the magnetic signal fields from the rotating magnetic disk. The sensor includes a nonmagnetic electrically conductive first spacer layer sandwiched between a ferromagnetic pinned layer structure and a ferromagnetic free layer structure. An antiferromagnetic pinning layer interfaces the pinned layer structure for pinning a magnetic moment of the pinned layer structure perpendicular to an air bearing surface (ABS) wherein the ABS is an exposed surface of the sensor that faces the magnetic disk. First and second leads are connected to the spin valve sensor for conducting a sense current therethrough.

In addition to the spin valve sensor the read head includes nonmagnetic electrically nonconductive first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer.

First and second leads are connected to the read sensor and extend therefrom between the first and second read gap layers and beyond the gap layers inside the slider to first and second lead ends which are located at an exterior surface of the slider. Third and fourth leads are connected across the write head and extend within the slider to spaced apart third and fourth lead ends at the exterior surface of the slider. First, second, third and fourth electrical pads are connected to the first, second, third and fourth lead ends for further connection to additional leads which connect the read and write heads to the aforementioned processing circuitry. During construction and assembly of the slider and the read and write heads, the sensor of the read head must be protected from electrostatic discharge (ESD) since the read sensor is a very small conductive element. The risk of damage to the write coil due to ESD is much less since it is a much larger conductive element. A discharge with only a few volts between the spaced apart first and second read pads can destroy or severely damage the read sensor. Such a discharge can occur by contact with or close proximity to a person, plastic involved in fabrication or components of the magnetic disk drive.

A typical arrangement for protecting the read sensor from ESD is to interconnect the first and second read pads with a thin film conductive line (shunt) on the exterior surface of the slider. This shorts the read circuit, preventing a discharge thereacross. The best time during assembly to form the conductive shunt between the pads is at the wafer level.

Magnetic heads are typically formed in rows and columns on the wafer which may be aluminum oxide/titanium carbide. At the wafer level the conductive shunts are formed between the read pads for shorting the read sensors. After formation of the magnetic heads the wafer is cut into rows. Each row is then cut into individual heads with a portion of the wafer serving as a slider for supporting the magnetic heads. Each slider with the heads mounted thereon is mounted on a head gimbal assembly (HGA) which, in turn, is mounted on a suspension which, in turn, is mounted on an actuator arm. A plurality of actuator arms may then be mounted in an actuator assembly to form a head stack assembly (HSA). From the time of forming the conductive shunts up to the time of forming the HSA the read sensors are protected from ESD. The next step is to merge the HSA with a disk stack assembly to form a complete disk drive which step is referred to in the art as "merge". The most practical time to sever the conductive shunt of each read head so that the read head becomes operational is just before merge. This severing may be done with a laser beam.

The slider material has very low electrical conductivity and therefore cannot function as a seed layer for plating the pads of the conductive shunt (if plated). A conductive seed layer, typically sputtered, is employed for plating the pads and to act as the whole or part of the conductive shunt. The slider typically has an overcoat of aluminum oxide at the location of the pads and the conductive shunt. Gold is a desirable material for the conductive shunt but has very poor adhesion to the aluminum oxide overcoat. Also, adhesion between patterning resist and gold is poor. Moreover, with giant magnetoresistive (GMR) and tunneling magnetoresistive (TMR) recording head technology, the recording sensor volume is very small and very sensitive to ESD. Although it is useful to provide a protecting shunt for the sensors through most of the processing, it is also important to remove the shunt prior to sensor testing and operation. One proposed solution is to use laser delete shunts, which are relatively expensive and require difficult manufacturing steps. Thus, an improved solution for protecting wafer-based structures from electrostatic discharge would be desirable.

SUMMARY OF THE INVENTION

One embodiment of a system, method, and apparatus for the present invention, a temporary, easily formed shunt is formed on a sensor during wafer processing without requiring additional wafer processing or fabrication. The shunt is also easily removed very late in the sensor forming process and thereby protects the sensor during most of the sensor formation steps. The shunt can be defined at various levels of resistance and provides sufficient ESD protection and superior cost benefits to the proposed laser delete technology.

In one embodiment, a method of temporarily protecting an electrically sensitive component from damage due to electrostatic discharge includes defining a shunt having first and second leads electrically connected in parallel with the component and separated by a gap. A portion of a shield layer is deposited to form the shunt between the first and second leads to span the gap therebetween and form a shunted assembly. The shunted assembly and component are lapped to form the ABS at the component in the same lapping operation at the same time, a sacrificial carbon overcoat is deposited on the ABS, and additional processing is performed on the shunted assembly. A portion of the shunted assembly, the shunt, and portions of the sacrificial carbon overcoat are then removed to form an electrical open for an unshunted assembly having ABS features comprising an air bearing cavity/deep gap at a former location of the shunted assembly. Alternatively, the shunt may be formed contiguously with the leads from a single type of lead material to define an integral shunt and form a shunted assembly. This alternative shunt structure can be removed with the same or similar process steps described above to form an electrical open between the leads.

In another embodiment the wafer-level shunt is incorporated into a TMR sensor design. The sensor has an air bearing surface (ABS), which is the theoretical wafer level position of the slider fabrication lapping termination. The sensor is formed with two shields. A bend is formed in the ABS at a short distance from the sensor. When the ABS is etched into the slider, this region of the ABS is recessed on the order of 1 µm and is called the deep etch region. The present invention centers a top of the shunt in this region with the bottom of the shunt being located therebelow. The two shields form the leads for the sensor. In order to electrically short the sensor, the shields are electrically connected to the shunt.

The shunt is fabricated by first depositing the shield one seed layer and plating shield one. At the same time a shield one bar is plated for the shunt. A protection layer may be used to protect the seed between shield one and the shield one material of the shunt. TMR material is deposited, milled, and refilled with insulation. The unmilled material remains as the sensor and the deep etch shunt. Shield two is deposited and shield two material connects to the top of the deep etch shunt. A metallic lead connection is located between the two shields. This step connects the shield two material of the shunt to shield two of the sensor.

In the present invention, the parallel shunt is established for the sensor through mask design without additional wafer processing. Since the tops of the deep etch shunt and the sensor are defined in the same mask step, the top of the deep etch shunt is accurately aligned in the deep etch pocket. The shunt remains in place and protects the sensor early in the wafer process and through most of the slider process. The shunt is then removed when the ABS mills out the deep etch region. Thus, protection for the sensor is provided during a majority of the processing steps. This scheme uses either an electronic lapping guide (ELG) on individual sliders for lapping, or the shunt resistance should be large enough so that the resistance of the sensor may be used for lapping. Quasi-static test (QST) may be performed after shunt removal if the shunt is low resistance. This technology is applicable to current perpendicular-to-the-plane (CPP) structures as well as current in-plane (CIP) structures.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
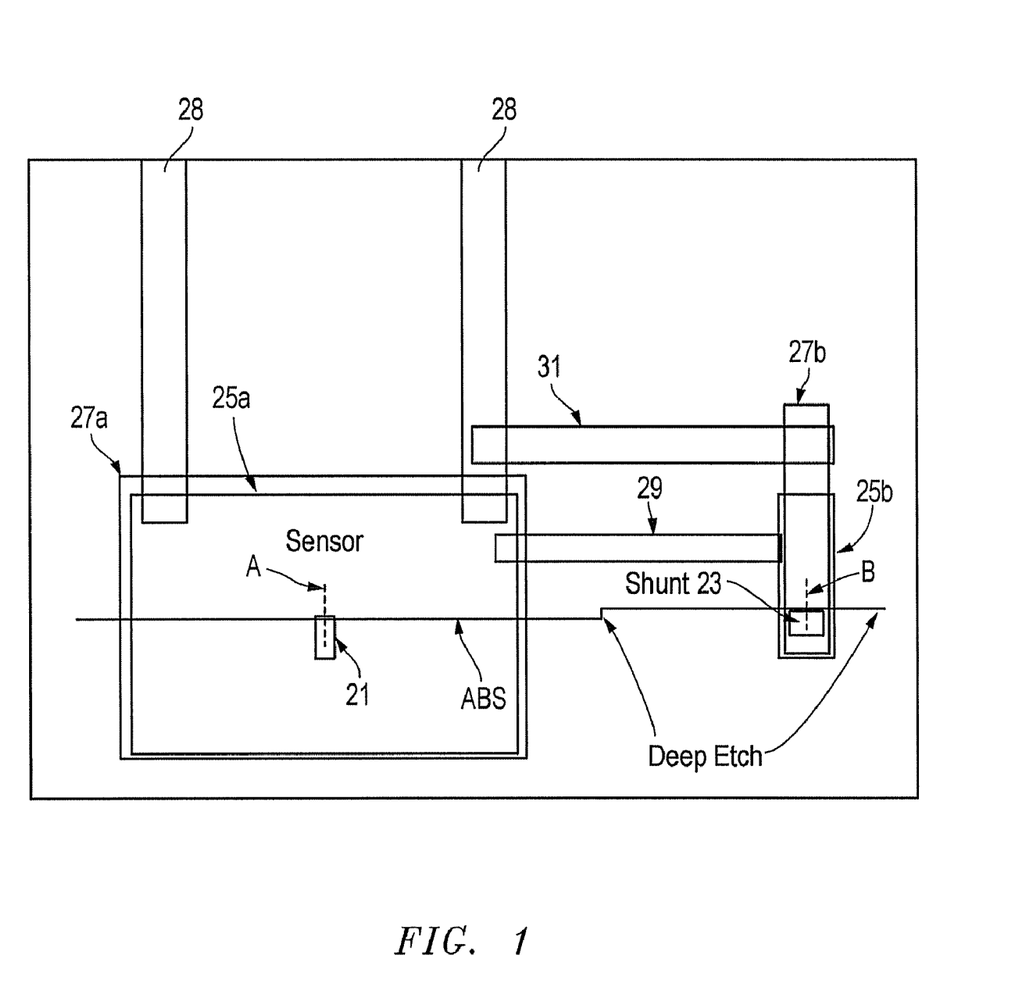
FIG. 1 is a schematic mask overlay of one embodiment of a TMR sensor design that incorporates a wafer level shunt constructed in accordance with the present invention.

Referring to FIG. 1, a schematic representation of one embodiment of a series of mask overlays of an electrical sensor (e.g., GMR or TMR) design that incorporates a temporary, wafer level shunt constructed in accordance with the present invention is shown. The relatively low resistance shunt is designed to protect electrically sensitive components (e.g., the sensor) from electrical damage, such as electrostatic discharge, while the sensor and structure are being fabricated during various wafer and slider processing steps.

FIG. 1 illustrates the build of a critical region of the design, including a sensor 21, which is located in a sensor region "A", and a shunt 23, which is located in a deep depth (e.g., deep etch) region "B". A significant advantage of the present invention is that the sensor 21 and shunt 23 can be built simultaneously to reduce cost. In one embodiment, the sensor has a pair of electrically conductive leads that are initially formed as first and second shields 25, 27. Other electrically conductive materials or components also may be used as the leads. Electrical connections 28 extend from shields 25, 27 to the drive. Numeral "25a" represents first shield material that is located in sensor region A, whereas numeral "25b" represents first shield material that is located in deep depth region B. First shield 25b is electrically connected to first shield 25a via electrically conductive material 29. Numeral "27a" represents second shield material that is located in sensor region A, whereas numeral "27b" represents second shield material that is located in deep depth region B. Second shield 27b is electrically connected to second shield 27a via electrically conductive material 31.

Referring now to FIGS. 2-8, one embodiment of a system, apparatus, and method of temporarily protecting an electrically sensitive component from damage due to electrostatic discharge is shown and described. The sensor and deep depth regions A and B are shown in each figure. Although they appear separate, the two views in each figure are actually sectional views of regions A and B taken along the small lines that appear in FIG. 1. Thus, each figure represents a stage of build in one embodiment of the process.

Figure 2:
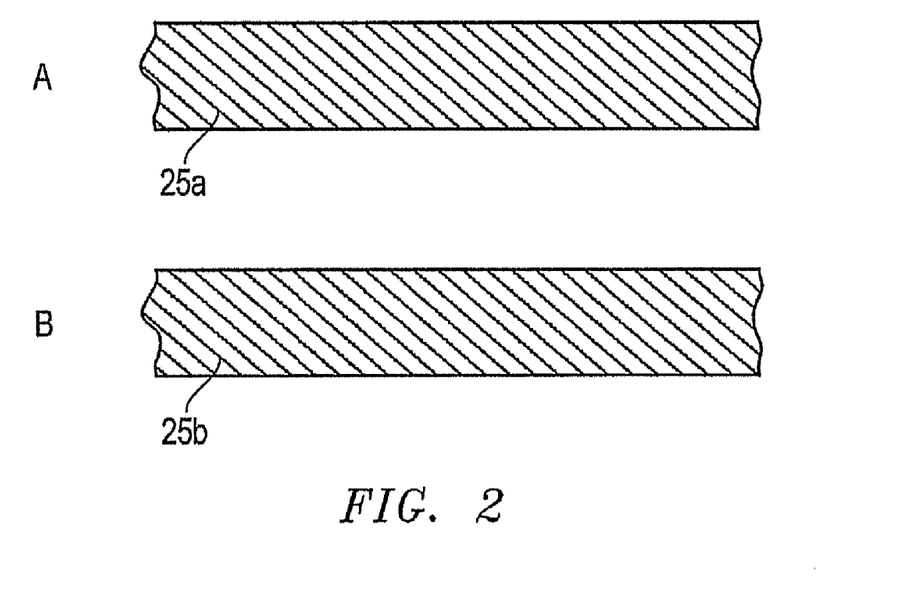
FIG. 2 is a schematic representation of one embodiment of an initial step used in forming the shunt and sensor of FIG. 1.
Figure 3:
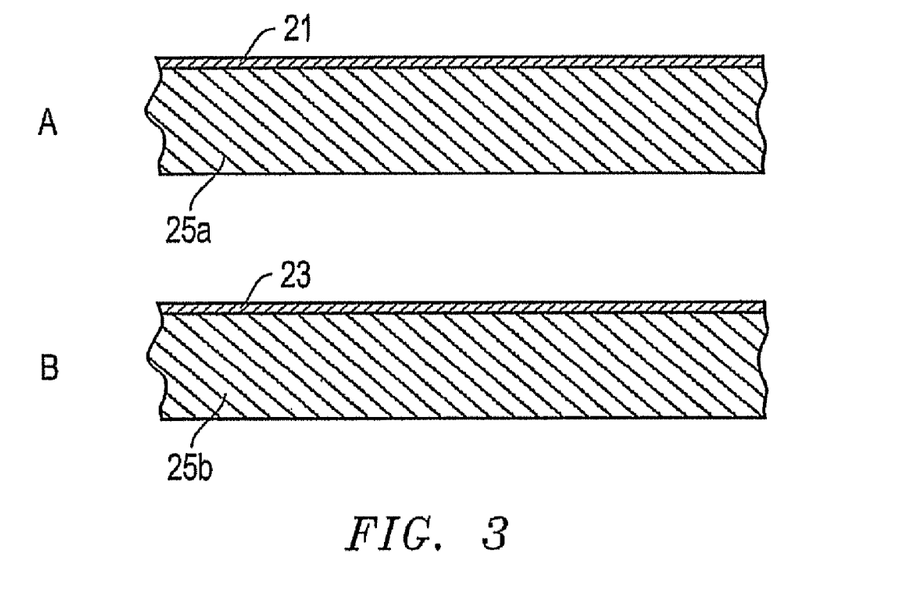
FIG. 3 is a schematic representation of a shunt and sensor forming step subsequent to FIG. 2.
Figure 4:
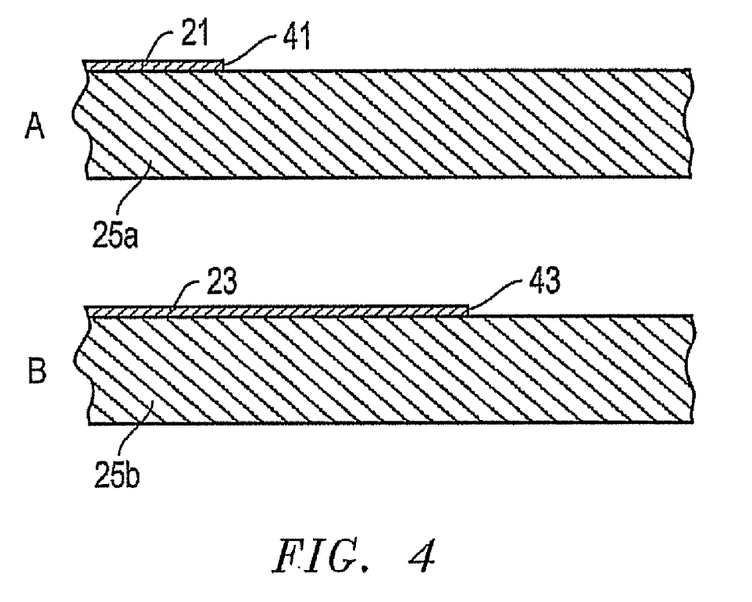
FIG. 4 is a schematic representation of a shunt and sensor forming step subsequent to FIG. 3.

As shown in FIG. 2, one embodiment of the present invention initially comprises defining the first shield 25 that forms the first lead for both a component 21 (e.g., a sensor) and a shunt 23 that will temporarily electrically protect the component 21. As shown in FIG. 3, a conductive material (e.g., CPP sensor) is deposited on the first shield 25 to form the component 21 and the shunt 23. Referring now to FIG. 4, an edge 41 of the component 21 and an edge 43 of the shunt 23 may be defined together in a single, simultaneous masking step in one embodiment. Edge 43 of shunt 23 is shown formed at a length that is greater than a length of the component 21 via photoresist and ion milling or reactive ion etching. The larger size of the shunt 23 reduces its electrical resistance and thereby provides a greater degree of electrical protection for the sensor 21 in the event of electrostatic discharge, etc.

Figure 5:
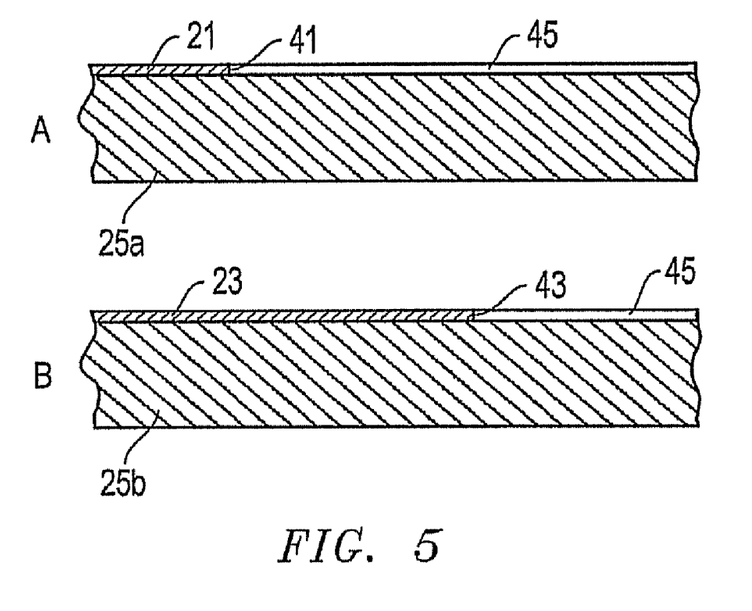
FIG. 5 is a schematic representation of a shunt and sensor forming step subsequent to FIG. 4.
Figure 6:
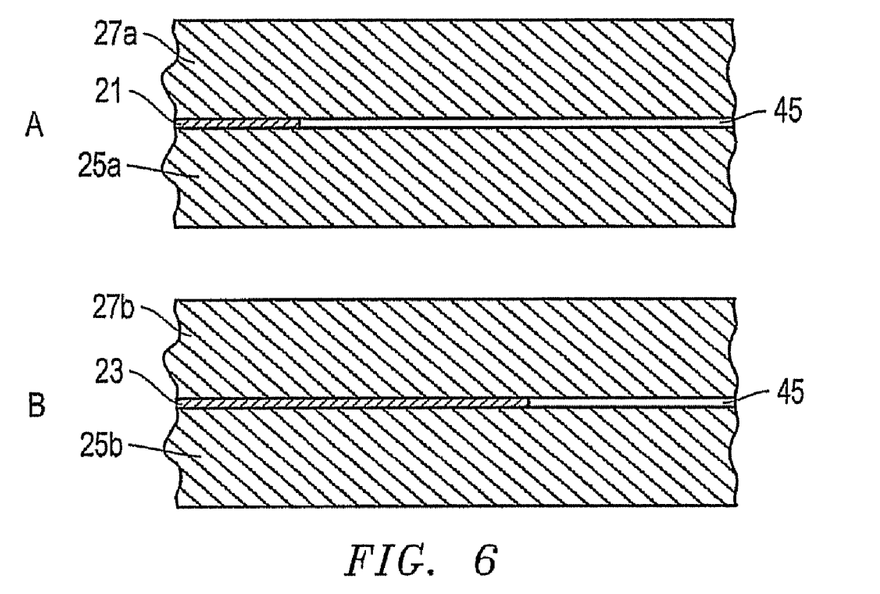
FIG. 6 is a schematic representation of a shunt and sensor forming step subsequent to FIG. 5.
Figure 7:
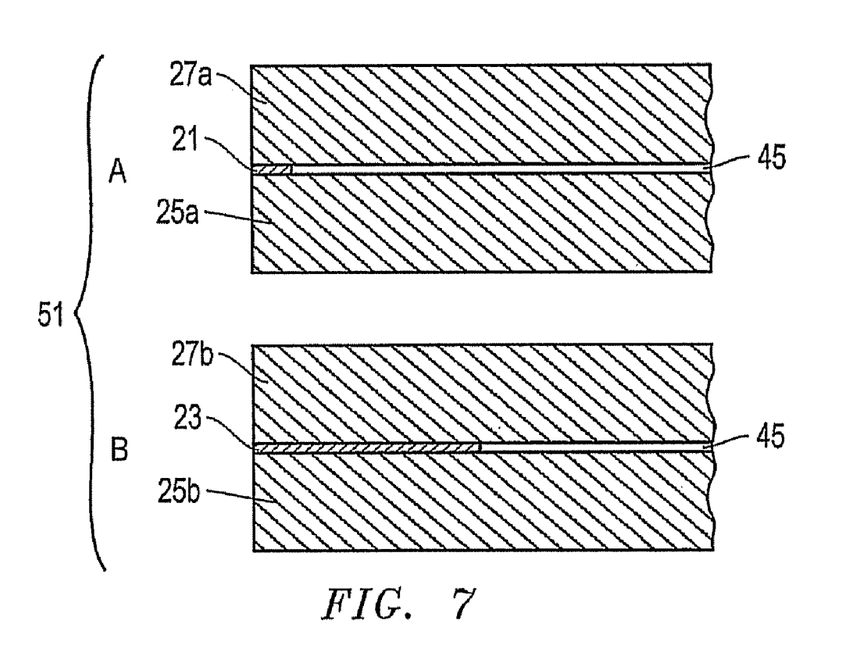
FIG. 7 is a schematic representation of a shunt and sensor forming step subsequent to FIG. 6.
Figure 8:
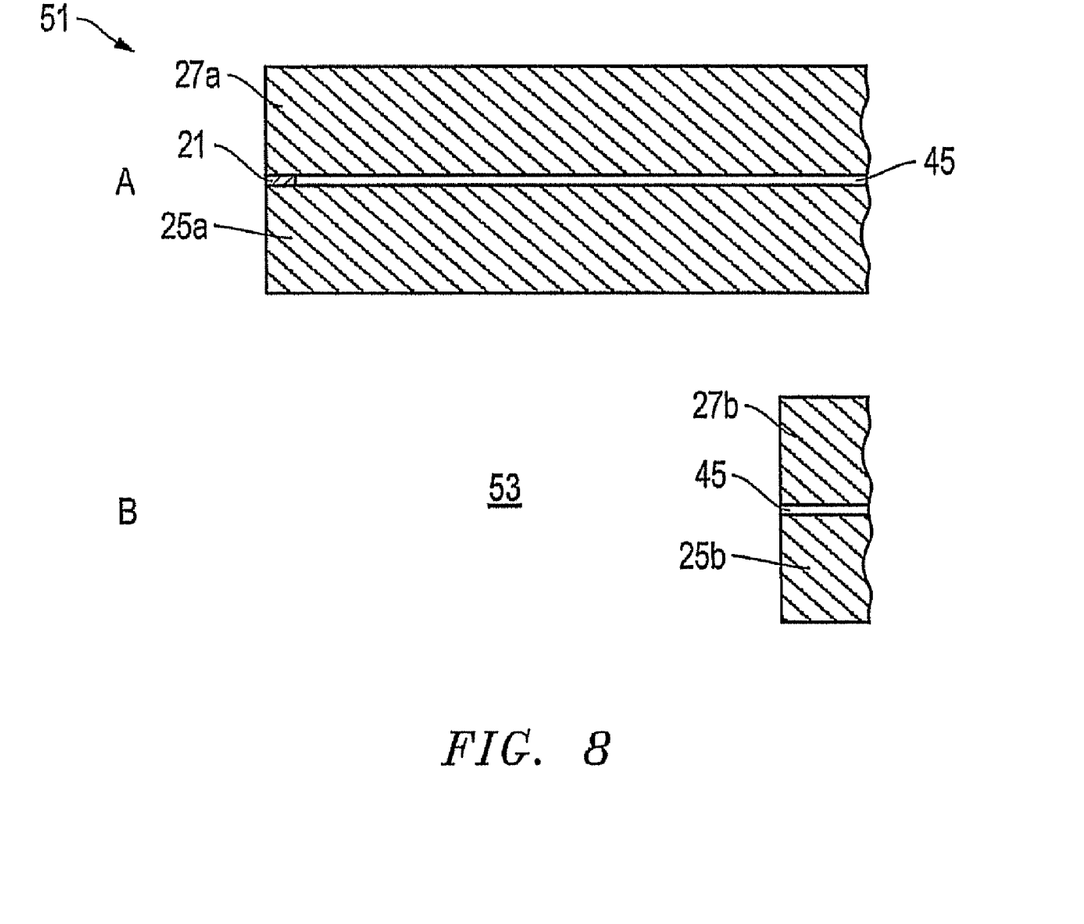
FIG. 8 is a schematic representation of a shunt and sensor forming step subsequent to FIG. 7.

As shown in FIG. 5, the present invention further comprises refilling with insulation 45 adjacent the component 21 and the shunt 23 relative to their respective edges 41, 43 on the first shield 25. For example, alumina may be used to refill via self alignment through the same photoresist mask used to pattern the sensor. A second shield 27 (FIG. 6) is defined on both the component 21 and the shunt 23 forms a second electrical lead for both the component 21 and the shunt 23 to form a shunted assembly that electrically protects the component 21. As shown in FIG. 7, the shunted assembly is lapped, such as in a single plane to form an air bearing surface 51. This step is typically performed after wafer level processing, and additional slider processing steps (as will be described below) for the shunted assembly are subsequently performed.

In order to remove the shunt 23 (FIG. 8), a portion of the shunted assembly is removed to form an electrical open 53 and define an unshunted assembly. This step may be performed by protecting the sensor region A of the component 21 with photoresist while ion milling or reactive ion etching the unprotected deep depth region B and the shunt 23.

Figure 9:
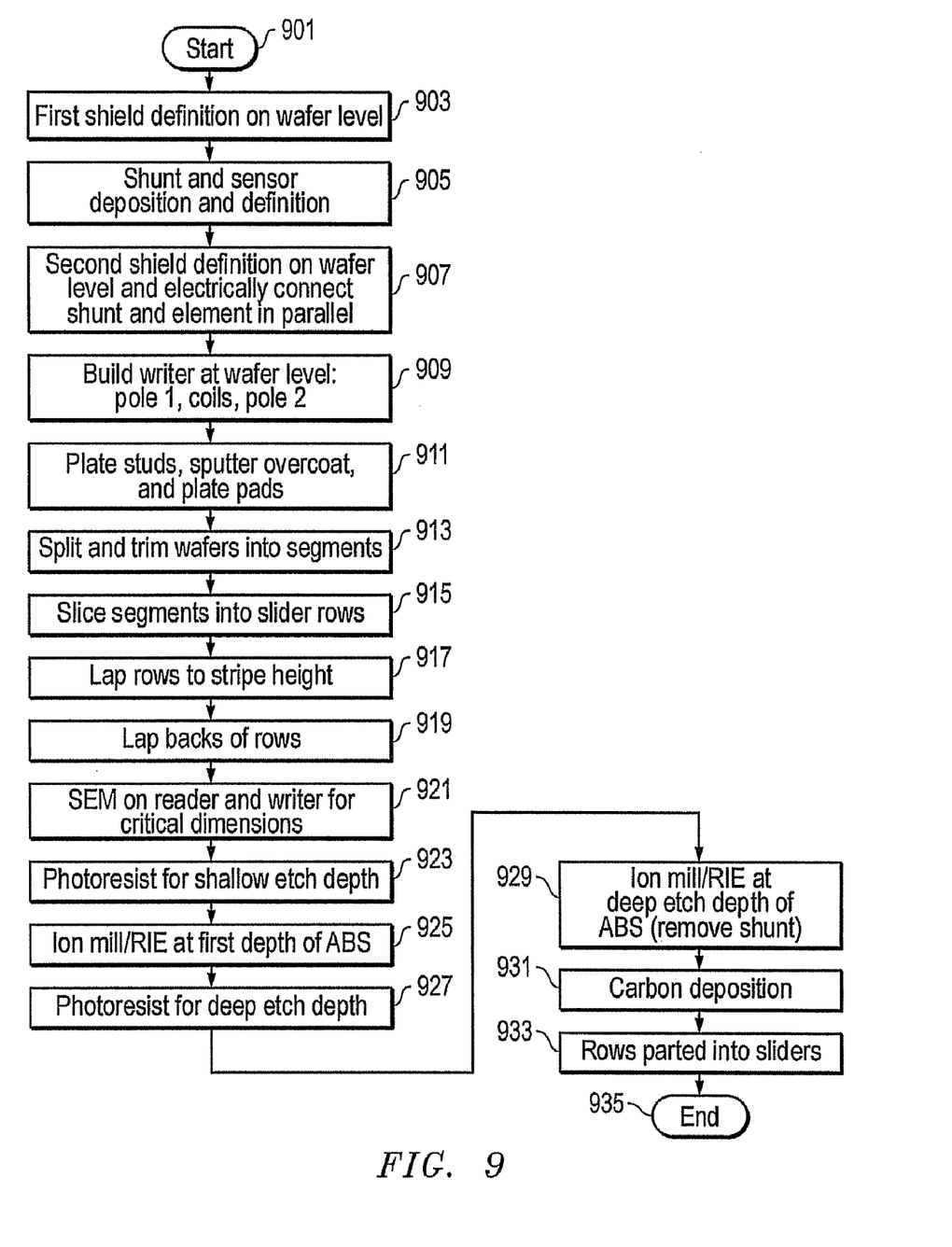
FIG. 9 is a high level flow diagram of one embodiment of a method constructed in accordance with the present invention.

In operation, the present invention is used during wafer and slider process fabrication to temporarily protect electrically sensitive components from damage due to electrostatic discharge. For example, FIG. 9 depicts one embodiment of a method performed in accordance with the present invention. The method starts as indicated at step 901, and proceeds to step 903 to define a first shield on a wafer that forms a first lead for both a component and a shunt. The method of forming the component and shunt continues as described above, and includes (step 905) depositing a conductive material on the first shield to form the component and the shunt; defining an edge of the component and an edge of the shunt together in a single masking step; and refilling with insulation adjacent the component and the shunt to their respective edges on the first shield.

As illustrated at step 907, the second shield is defined on both the component and the shunt that forms a second lead for both the component and the shunt to form a shunted assembly that electrically protects the component. A writer (i.e., write element) is built (step 909) on the shunted assembly on the wafer, and other steps are performed, such as plating the wafer (e.g., studs, pads) and sputtering an overcoat (step 911). The wafer is then split into segments and trimmed (step 913), before slicing the segments into slider rows (step 915). The method also comprises lapping the slider rows (step 917) to a stripe height and lapping the backs (step 919) of the slider rows. Step 921 comprises checking critical dimensions of the writer, such as with a scanning electron microscope. Since the SEM bombards the structure with electrons, the ESD protection provided by the shunt may be especially beneficial during this step.

As depicted at step 923, photoresist is applied to the shunted assembly for a shallow first depth (e.g., 0.2 to 0.3 μm), and the shallow first depth of an air bearing surface on the shunted assembly is removed (step 925). For example, this may comprise ion milling or reactive ion etching. Photoresist is applied to the shunted assembly for a deep second depth (step 927), and the deep second depth (e.g., 0.8 to 1.3 μm) of the air bearing surface is removed (step 929) to remove the shunt and form an electrical open for an unshunted assembly. After the shunt is removed, the component is more susceptible to ESD damage during the subsequent steps, such as carbon deposition (step 931), parting the rows into sliders (step 933), etc., before ending the method as illustrated as step 935.

Figure 10:
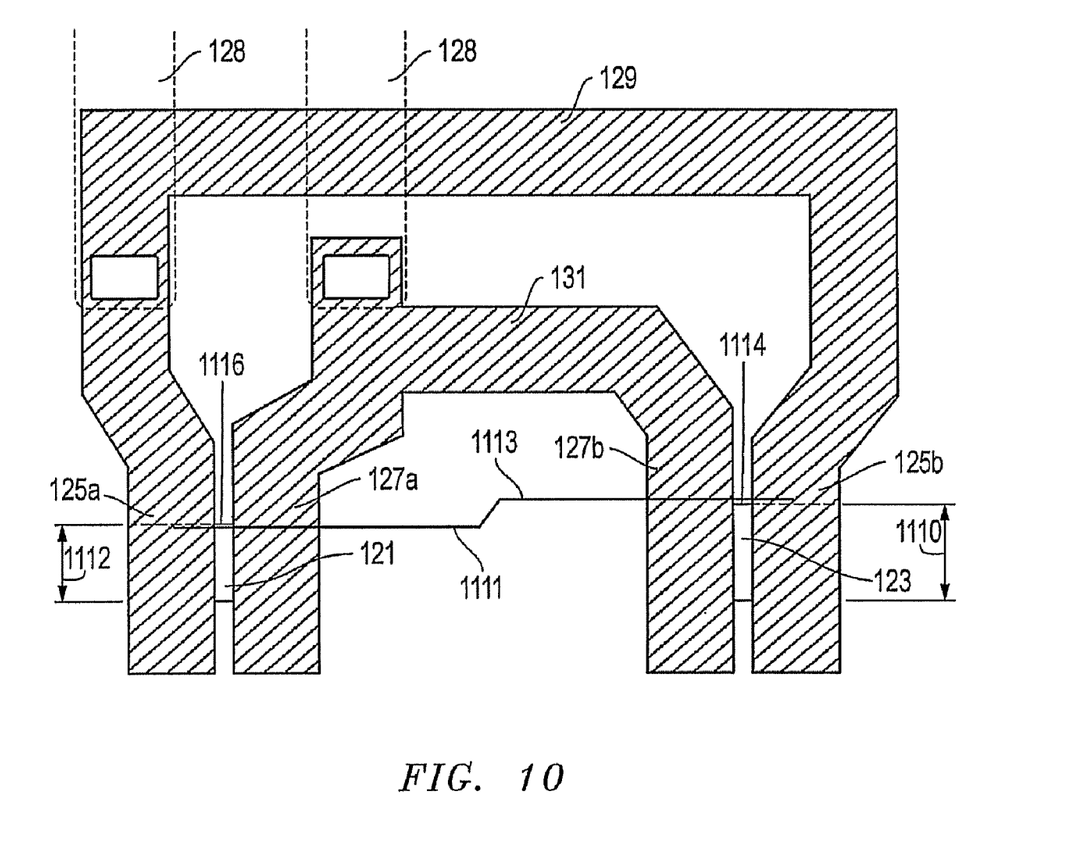
FIG. 10 is a schematic mask overlay of one embodiment of a CIP design that incorporates a wafer level shunt constructed in accordance with the present invention.

Referring now to FIG. 10, another embodiment of the present invention is adaptable for CIP technology. The build of a critical region of the design includes a sensor 121 and a temporary electrical shunt 123, which are connected in parallel and can be built simultaneously. The sensor 121 has a pair of electrically conductive leads 125, 127 that operate in a similar manner to those described above to connect the sensor 121 and shunt 123. Electrical connections 128 extend from leads 125, 127 to the drive. Leads 125a and 125b are electrically connected via electrically conductive material 129, and leads 127a and 127b are electrically connected via electrically conductive material 131.

With respect to this design, one method of temporarily protecting an electrically sensitive component from damage due to electrostatic discharge comprises: depositing a conductive material on a wafer to form the component and the shunt; defining an edge of the component and an edge of the shunt together in a single masking step; refilling with insulation adjacent the component and the shunt to their respective edges on the wafer; defining a track width of the component and the shunt in a photolithography step; refilling the component and the shunt using self-alignment to refill with conductive material on both sides of the component and the shunt to form a shunted assembly; lapping the shunted assembly; and removing a portion of the shunted assembly to remove the shunt and form an electrical open for an unshunted assembly.

Figure 11:
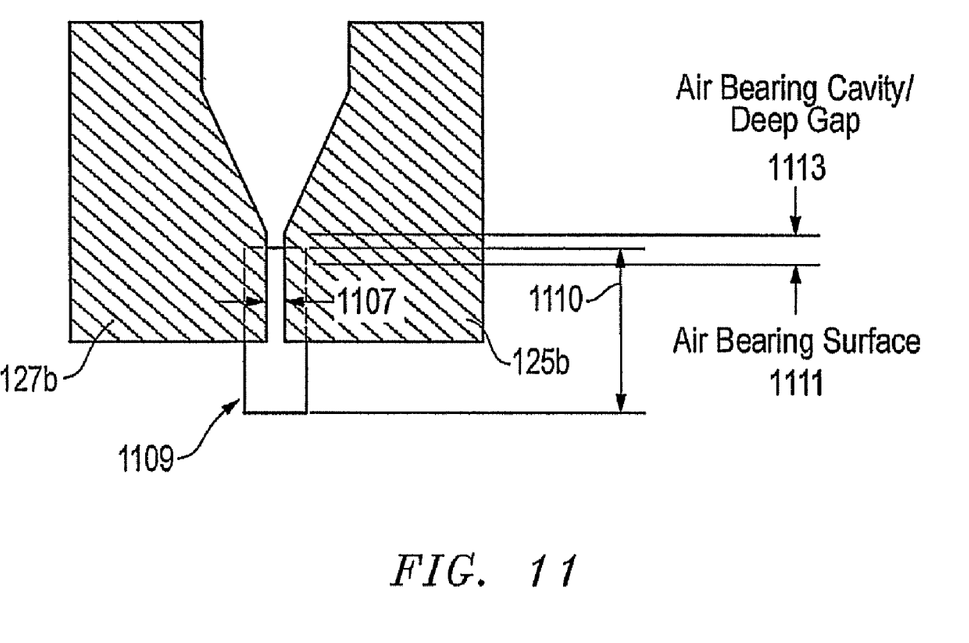
FIG. 11 is a schematic mask overlay of an alternate embodiment of the invention detailing a CIP shunt design incorporating a portion of a shield layer as the shunt and is constructed in accordance with the present invention.

Referring now to FIG. 11, another embodiment of the invention also comprises temporarily protecting an electrically sensitive component (e.g., sensor 121 in FIG. 10) from damage due to electrostatic discharge. As shown in FIG. 11, which essentially replaces the lower right side of FIG. 10, first and second leads 125*b*, 127*b* are separated by a gap 1107. A portion of the shield layer (i.e., shunt) 1109 is formed between the first and second leads 125*b*, 127*b* and spans the gap 1107 to define the shunt 1109 therebetween and form a shunted assembly. Shunt 1109 may be formed with a length 1110, or stripe height (a term of art), that is greater than a length 1112, or stripe height, of the component 121 such that the back end 1116 of the component 121 lies closer to a location of a planar portion of the ABS defined by its position at the component (reference line 1111 of FIGS. 10 and 11) than the back end 1114 of the shunt 1109 (compare FIGS. 10 and 11). As shown in FIG. 10, reference lines 1111, 1113 represent a profile of the ABS as it extends from the component to the shunt assembly. Shunt 1109 may be formed via thin film deposition and photolithographic processes known in the art.

The shunted assembly and component are lapped (which may be performed after wafer level processing) to define the ABS at the location of the component and at a position 1111 over the shunted assembly; a sacrificial carbon overcoat is then deposited over the component and over the shunt; and, additional processing (e.g., cleaning operations) are performed on the shunted assembly. In one embodiment, a portion of the shunted assembly, the shunt, and portions of the sacrificial carbon overcoat are removed up to position 1113 where at an air bearing cavity/deep gap (ABC/DG) is formed. This step concomitantly forms an electrical open for an unshunted assembly having ABS features comprising an air bearing cavity/deep gap at a former location of the shunted assembly. These operations may be performed while protecting a region of the component (see, e.g., FIG. 10) with photoresist. Ion milling and reactive ion etching, can be used to remove the portion of the shunted assembly, the shunt, and portions of the sacrificial carbon overcoat up to reference line 1113.

In another embodiment, the unshunted assembly is lightly milled to remove all of the sacrificial carbon overcoat from the unshunted assembly. Finally, a non-sacrificial carbon overcoat is deposited. In other embodiments, the width of the gap may range from 0.05 $\mu$ to 10 $\mu$ wide, and from 0.25 $\mu$ to 1 $\mu$, to prevent electrical shorts between the first and second leads. In addition, the leads may be formed from a noble metal, such as tantalum, rhodium, gold, and chromium. Moreover, the invention can be used to protect a component comprising (but not exclusively) a TMR sensor, a CPP-GMR sensor, and a CIP spin valve sensor.

Figure 12:
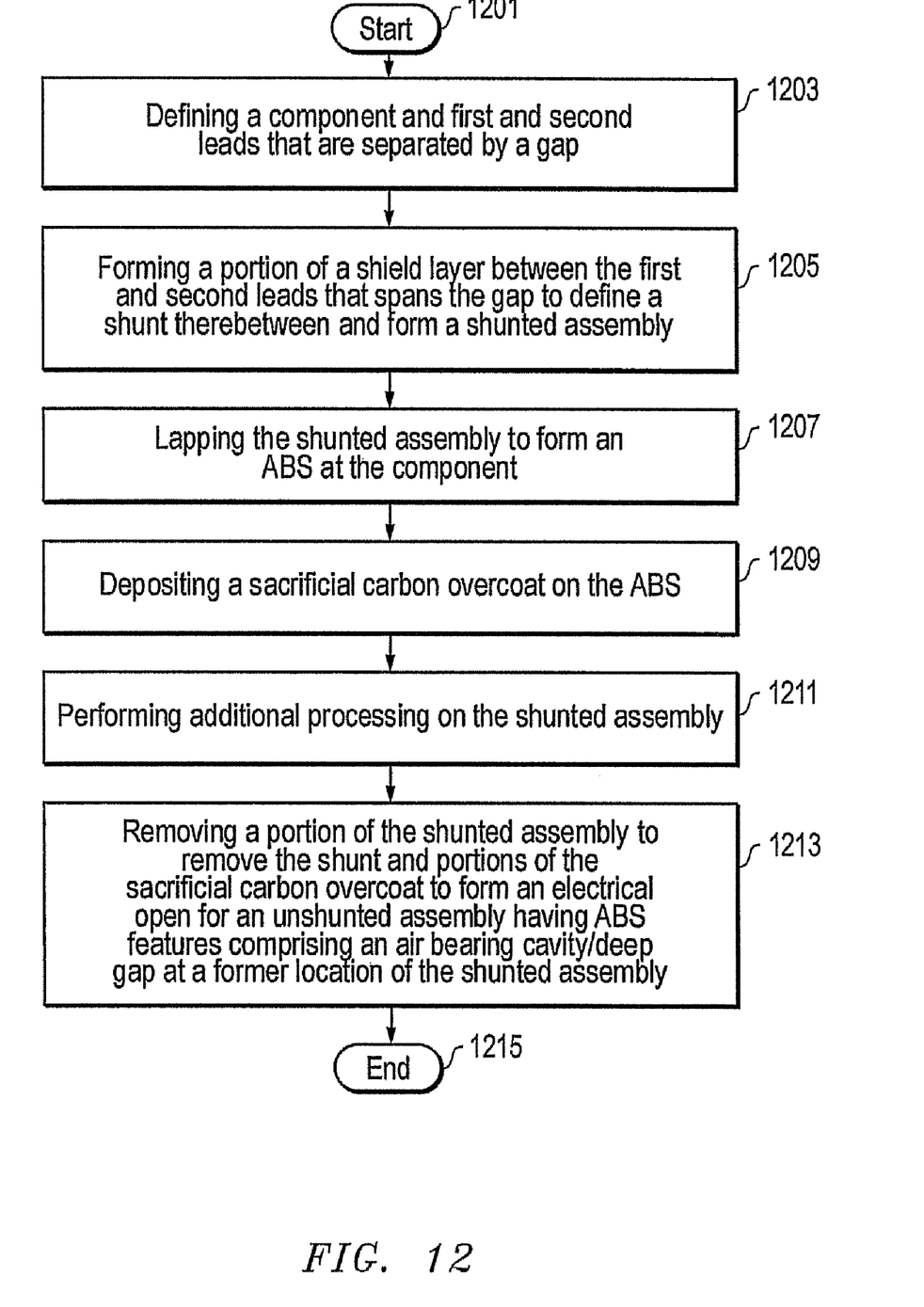
FIG. 12 is a high level flow diagram of another embodiment of a method constructed in accordance with the present invention.

Referring now to FIG. 12, a high level flow diagram of another embodiment of a method constructed in accordance with the present invention is shown. The method begins as indicated at step 1201, and comprises: defining a component and first and second leads electrically connected in parallel with the component and separated by a gap (step 1203); forming a portion of a shield layer between the first and second leads that spans the gap to define a shunt therebetween and form a shunted assembly (step 1205); lapping the shunted assembly and the component to form the ABS at the component (step 1207); depositing a sacrificial carbon overcoat on the ABS (step 1209); performing additional processing on the shunted assembly (step 1211); removing a portion of the shunted assembly to remove the shunt and portions of the sacrificial carbon overcoat to form an electrical open for an unshunted assembly having ABS features comprising an air bearing cavity/deep gap at a former location of the shunted assembly (step 1213); before ending as indicated at step 1215.

Figure 13:
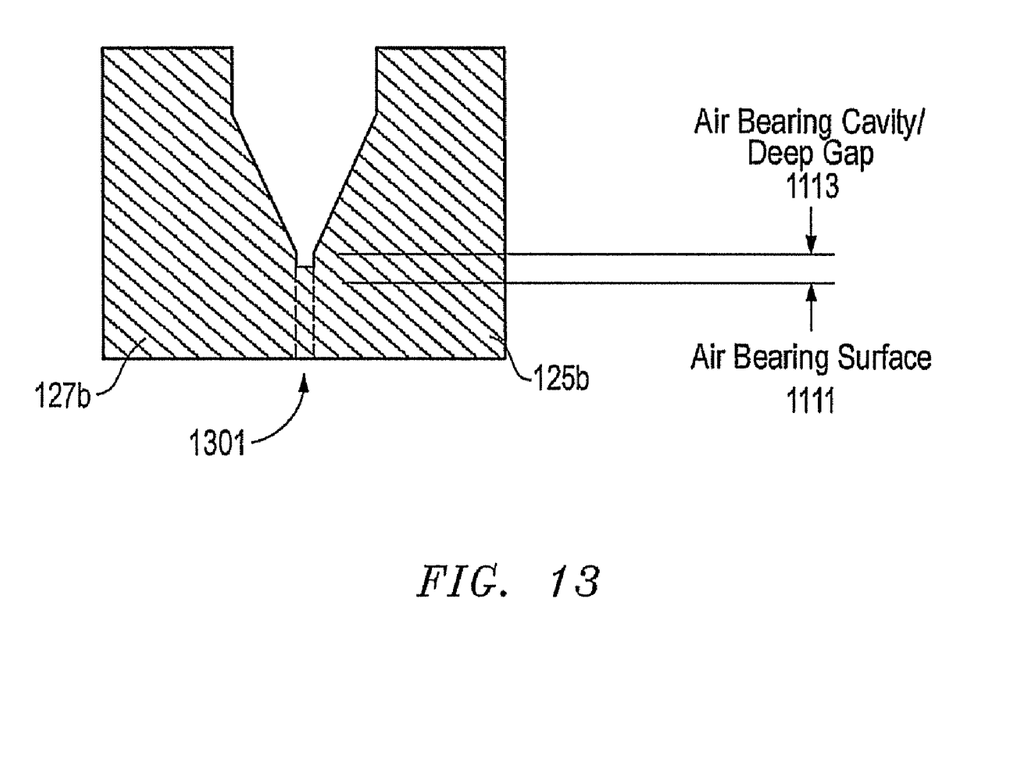
FIG. 13 is a schematic mask overlay of an alternate embodiment of the invention detailing a CIP shunt design contiguously formed with lead material as an integral shunt and is constructed in accordance with the present invention.

Referring now to FIG. 13, another embodiment of the invention that is an alternative for the lower right side of FIG. 10 comprises defining a component 121 (FIG. 10) and first and second leads 125*b*, 127*b*. However, in this version, first and second leads 125*b*, 127*b* may be contiguously formed from a single type of lead material to define an integral shunt 1301 and form a shunted assembly. The temporary shunt 1301 is then removed with the same or similar process steps described above to form an electrical open between the first and second leads 125*b*, 127*b*.

The present invention has several advantages, including the ability to form temporary shunts on ESD-sensitive sensors during wafer processing without requiring additional wafer processing or fabrication. The shunts are removed very late in the sensor forming process without the requirement of additional processing steps and protect the sensors during most of the sensor formation steps. The shunts provide sufficient ESD protection and superior cost benefits to the commonly proposed laser delete technology. The shunts are established for the sensors through mask design without additional wafer processing. Since the tops of the deep etch shunts and the sensors are defined in the same mask step, the top of the deep etch shunts are accurately aligned in the deep etch pockets. The shunts remain in place and protect the sensors early in the wafer process and through most of the slider process.

While the invention has been shown or described in only some of its forms, it should be apparent to those skilled in the art that it is not so limited, but is susceptible to various changes without departing from the scope of the invention.

What is claimed is:

1. A method of temporarily protecting an electrically sensitive component from damage due to electrostatic discharge, the method comprising:
   (a) defining a component and first and second leads that are separated by a gap;
   (b) forming a portion of a shield layer between the first and second leads that spans the gap to define a shunt therebetween and form a shunted assembly;
   (c) lapping the shunted assembly and component to form an air bearing surface (ABS) at the component;
   (d) depositing a sacrificial carbon overcoat on the ABS;
   (e) performing additional processing on the shunted assembly; and
   (f) removing a portion of the shunted assembly to remove the shunt and portions of the sacrificial carbon overcoat to form an electrical open for an unshunted assembly having ABS features comprising an air bearing cavity at a location of the shunted assembly.

2. A method as defined in claim 1, wherein the gap formed between the first and second leads is in a range of 0.05 $\mu$ to 10 $\mu$ wide.

3. A method as defined in claim 1, wherein the gap formed between the first and second leads is in a range of 0.25 $\mu$ to 1 $\mu$ wide.

4. A method as defined in claim 1, wherein the first and second leads are formed from a noble metal.

5. A method as defined in claim 1, wherein the first and second leads are formed from a material selected from the group consisting of tantalum, rhodium, gold, and chromium.

6. A method as defined in claim 1, wherein the component is selected from the group consisting of: a TMR sensor, a CPP-GMR sensor, and a CIP spin valve sensor; and, wherein the shunted assembly is lapped in a single plane to form the ABS at a location of the component.

7. A method as defined in claim 1, wherein step (b) comprises forming the shunt at a length that is greater than a length of the component wherein a back end of the component lies closer to a location of a planar portion of the ABS defined by a position at the back end of the component than a back end of the shunt.

8. A method as defined in claim 1, wherein step (c) is performed after wafer level processing, step (e) comprises cleaning, and step (f) is performed while protecting a region of the component with photoresist.

9. A method as defined in claim 1, wherein step (f) further comprises one of ion milling and reactive ion etching to remove the portion of the shunted assembly having the shunt.

10. A method of temporarily protecting an electrically sensitive component from damage due to electrostatic discharge, the method comprising:
   (a) defining a component and first and second leads that are separated by a gap;
   (b) forming a portion of a shield layer between the first and second leads that spans the gap to define a shunt therebetween and form a shunted assembly;
   (c) lapping the shunted assembly and component to form an air bearing surface (ABS) at the component;
   (d) depositing a sacrificial carbon overcoat on the ABS;
   (e) performing additional processing on the shunted assembly;
   (f) removing a portion of the shunted assembly to remove the shunt and portions of the sacrificial carbon overcoat to form an electrical open for an unshunted assembly having ABS features comprising an air bearing cavity at a location of the shunted assembly;
   (g) lightly milling the unshunted assembly to remove all of the sacrificial carbon overcoat from the unshunted assembly including removal of the sacrificial carbon overcoat on the component; and
   (h) depositing a non-sacrificial carbon overcoat on the component.

11. A method as defined in claim 10, wherein the gap formed between the first and second leads is in a range of 0.05 μ to 10 μ wide to prevent electrical shorts between the first and second leads.

12. A method as defined in claim 10, wherein the gap formed between the first and second leads is in a range of 0.25 μ to 1 μ wide to prevent electrical shorts between the first and second leads.

13. A method as defined in claim 10, wherein the first and second leads are formed from a noble metal.

14. A method as defined in claim 10, wherein the first and second leads are formed from a material selected from the group consisting of tantalum, rhodium, gold, and chromium.

15. A method as defined in claim 10, wherein the component is selected from the group consisting of: a TMR sensor, a CPP-GMR sensor, and a CIP spin valve sensor; and,
   wherein the shunted assembly is lapped in a single plane to form the ABS at a location of the component.

16. A method as defined in claim 10, wherein step (b) comprises forming the shunt at a length that is greater than a length of the component wherein a back end of the component lies closer to a location of a planar portion of the ABS defined by a position at the back end of the component than a back end of the shunt.

17. A method as defined in claim 10, wherein step (c) is performed after wafer level processing, step (e) comprises cleaning, and step (f) is performed while protecting a region of the component with photoresist.

18. A method as defined in claim 10, wherein step (f) further comprises one of ion milling and reactive ion etching to remove the portion of the shunted assembly having the shunt.

* * * * *